United States Patent [19]

Messerschmidt

[11] 4,046,478
[45] Sept. 6, 1977

[54] SECURING MEANS FOR FUEL INJECTION NOZZLES

[75] Inventor: Friedrich Messerschmidt, Stuttgart, Germany

[73] Assignee: Robert Bosch G.m.b.H., Stuttgart, Germany

[21] Appl. No.: 626,182

[22] Filed: Oct. 28, 1975

Related U.S. Application Data

[63] Continuation of Ser. No. 231,115, March 2, 1972, abandoned.

[30] Foreign Application Priority Data

Mar. 2, 1971 Germany ............................ 2109727

[51] Int. Cl.² .............................................. F16B 9/00
[52] U.S. Cl. .................................... 403/262; 285/189
[58] Field of Search .................. 279/89; 285/414, 189; 403/262, 263, 261, 353

[56] References Cited

U.S. PATENT DOCUMENTS 2,719,750  10/1955  Orr ....................................... 403/252

FOREIGN PATENT DOCUMENTS 1,010,783  6/1957  Germany ............................ 403/262

Primary Examiner—Andrew V. Kundrat
Attorney, Agent, or Firm—Edwin E. Greigg

[57] ABSTRACT

For tightening a fuel injection nozzle to the cylinder head of an internal combustion engine, a portion of that part of the nozzle body which projects from the cylinder head is provided with diametrically opposed flattened areas to define bounding shoulders that are engaged by a flange. The latter comprises a straight-edged opening straddling the flattened areas. The flange is fastened to the cylinder head by means of bolts and nuts.

3 Claims, 3 Drawing Figures

Fig. 1
Fig. 2
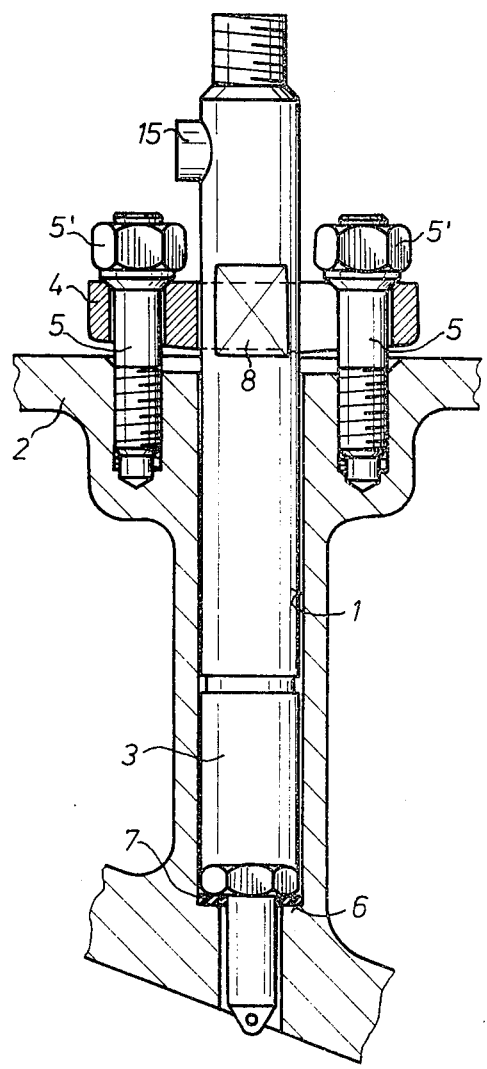
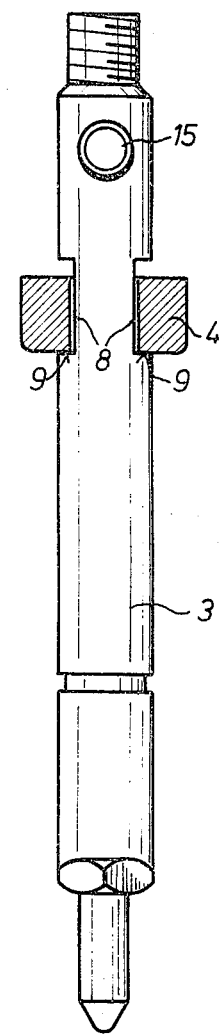
Fig. 3
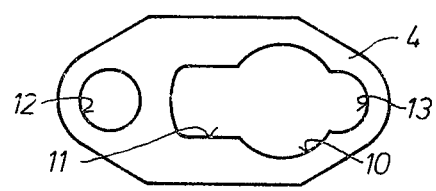

SECURING MEANS FOR FUEL INJECTION NOZZLES

This is a continuation of application Ser. No. 231,115 filed Mar. 2, 1972. abandoned.

BACKGROUND OF THE INVENTION

This invention relates to means for securing fuel injection nozzles to internal combustion engines and is of the type that comprises a flange member which, by means of bolts, clamps the fuel injection nozzle to the cylinder head and which, for this purpose, exerts a force on a shoulder of the nozzle body. The flange is provided with a bore having a diameter at least as large as the outer diameter of the nozzle body.

In a known securing means of the aforenoted type (as disclosed, for example, in German Pat. No. 1,010,783), the fuel injection nozzle is provided with a flange which is in engagement with an overlapping or coupling flange which, in turn, is tightened to the engine cylinder by means of bolts. The flange and the coupling flange are so designed that when the latter is slid over the fuel injection nozzle from the side of the engine and rotated, it cooperates with the flange as a bayonet lock. To permit an interengagement between the flange and the coupling flange, the latter is provided with flange projections, while the flange integral with the fuel injection nozzle is provided with complemental openings. A securing means of the aforenoted type, however, requires that the flange integral with the nozzle has a diameter that is greater than the outer diameter of the nozzle body.

SUMMARY OF THE INVENTION

It is an object of the invention to provide an improved securing means for a fuel injection nozzle which has a substantially uniform body diameter and thus may be manufactured inexpensively from a stock of circular cross section.

Briefly stated, according to the invention, the nozzle body, for forming a shoulder, is flattened along a longitudinal midportion. The coupling flange has a circular opening for sliding it axially on the nozzle body, and a radially oriented straight-edged opening extending from the circular opening to sit on the shoulder bounding said flattened portion after sliding the inserted flange normal to the nozzle axis.

BRIEF DESCRIPTION OF THE DRAWING

The invention will be better understood as well as further objects and advantages become more apparent from the ensuing detailed specification of a preferred, although exemplary embodiment, taken in conjunction with the drawing, wherein:

FIG. 1 is a longitudinal, partially sectional view of a cylinder head portion and securing means according to the preferred embodiment of the invention;

FIG. 2 is a longitudinal, partially sectional view of the preferred embodiment as seen in a direction normal to the view of FIG. 1; and FIG. 3 is a plan view of a component of the preferred embodiment as seen from the engine.

DESCRIPTION OF THE PREFERRED EMBODIMENT

Turning now to FIGS. 1 and 2, in a bore 1 of an only partially and sectionally shown engine cylinder head 2 there is disposed a fuel injection nozzle 3 which is tightened against a seat 6 by means of a flange 4 engaged by bolts 5 and nuts 5'. Between the seat 6 and a cooperating lower shoulder of the fuel injection nozzle 3 there is disposed a packing ring 7. The nozzle body has at diametrically opposed locations flattened portions 8 which, from below, are bounded by shoulders 9 adapted to be engaged by the flange 4.

Turning now to FIG. 3, the flange 4 has a large eccentric circular opening 10, the diameter of which is somewhat larger than the diameter of the nozzle body so that the flange 4 may be slid over the nozzle body in an axial direction from either end. Thus, the outer diameter of the entire nozzle body is substantially uniform and is smaller than the circular opening 10 of the flange 4. The circular opening 10 has, at its side adjacent the middle of the flange 4, and opening 11 provided with two opposite straight sides extending parallel with the longitudinal axis of the flange. The distance between the two opposite edges of the opening 11 is somewhat larger than the distance between the two flattened areas 8. Further, on the flange 4 there is provided a smaller circular opening 12 as well as a circular opening 13 communicating with the opening 10 and situated diametrically opposite from the opening 11. The openings 12 and 13 are adapted to receive bolts 5 which are threadedly engaging the cylinder head 2. The bolts 5 receive at their outer ends nuts 5' which are tightened against the flange 4.

For mounting the fuel injection nozzle 3, it is first inserted into the bore 1 of the cylinder head 2 and then the portion thereof projecting from the cylinder head is passed through the circular opening 10 of the flange 4 by lowering the latter towards the outer face of the cylinder head 2. During this step the leakage nipple 15 of the nozzle 3 passes through the opening 11. As soon as the flange 4, during its displacement parallel with the nozzle axis reaches the flattened portions 8, it is displaced parallel to its length (that is, normal to the nozzle axis) and, as a result, the body of the nozzle is so shifted that the flattened areas 8 assume their position in the opening 11. Subsequently, the nozzle is tightened to the engine cylinder by means of bolts and nuts 5, 5', so that the flange 4, by virtue of its engagement with the shoulders 9 of the nozzle body, clamps the latter against the cylinder head 2.

What is claimed is:

1. Means for securing a fuel injection nozzle body to the cylinder head of an internal combustion engine, the body having a generally circular cross section, a flattened area provided on the outer surface of the nozzle body along a portion thereof and a shoulder forming part of the nozzle body and bounding the flattened area, with the shoulder extending radially inwardly towards the flattened area, said securing means comprising
   A. a separate flange having:
      1. a first opening of a diameter at least as large as the diameter of the nozzle body for permitting the latter to pass through said flange;
      2. a second opening extending from said first opening and having a width sufficiently large to receive the thickness of the nozzle body at the flattened area thereof;
      3. a third opening extending from said first opening for receiving therethrough bolt means;
      4. a fourth opening separate from said other openings for receiving therethrough bolt means; and B. bolt means dimensioned for reception within said third and fourth opening for tightening said flange to the cylinder head, whereby said flange engages the shoulder of the nozzle body with a flange portion immediately adjacent and along said second opening and thereby clamps the nozzle body to the cylinder head.

2. Means as defined in claim 1, wherein two flattened areas are disposed at diametrically opposed locations of said nozzle body, said second opening including two straight parallel bounding edges spaced from one another at a distance slightly larger than the distance between the diametrically opposed flattened areas.

3. Means as defined in claim 1, wherein one portion of said fuel injection nozzle projects out of said cylinder head; said last-named portion carrying a radially extending leakage nipple, said last-named portion having a diameter smaller than that of said first opening, said second opening being so dimensioned as to allow said leakage nipple to pass through said flange.

* * * * *